(12) United States Patent
Guering et al.

(10) Patent No.: US 10,589,875 B2
(45) Date of Patent: Mar. 17, 2020

(54) METHOD FOR THERMOPHONICALLY INSULATING AN AIRCRAFT SECTION DESCRIPTION

(71) Applicant: Airbus Operations SAS, Toulouse (FR)

(72) Inventors: Bernard Guering, Montrabe (FR); Matthieu De Kergommeaux, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 105 days.

(21) Appl. No.: 16/027,779

(22) Filed: Jul. 5, 2018

(65) Prior Publication Data
US 2019/0009929 A1 Jan. 10, 2019

(30) Foreign Application Priority Data
Jul. 7, 2017 (FR) ...................... 17 56470

(51) Int. Cl.
*B64F 5/10* (2017.01)
*B64C 1/40* (2006.01)

(52) U.S. Cl.
CPC .................. *B64F 5/10* (2017.01); *B64C 1/40* (2013.01); *B64C 1/403* (2013.01)

(58) Field of Classification Search
CPC .............. B64F 5/10; B64C 1/40; B64C 1/403
See application file for complete search history.

(56) References Cited

U.S. PATENT DOCUMENTS

| | | | | |
|---|---|---|---|---|
| 5,398,889 A * | 3/1995 | White | ..................... | B64C 1/067 244/119 |
| 2005/0211839 A1 * | 9/2005 | Movsesian | ................ | B64C 1/40 244/119 |
| 2009/0230244 A1 * | 9/2009 | Kofinger | ................. | B64C 1/066 244/118.5 |
| 2009/0272849 A1 * | 11/2009 | Koefinger | ............... | B64C 1/066 244/131 |
| 2011/0024565 A1 * | 2/2011 | Koefinger | ............... | B64C 1/066 244/131 |
| 2011/0233336 A1 * | 9/2011 | Dervault | ................... | B64C 1/12 244/119 |
| 2018/0178897 A1 * | 6/2018 | Guering | .................. | B64C 1/403 |
| 2019/0009929 A1 * | 1/2019 | Guering | .................... | B64F 5/10 |
| 2019/0270506 A1 * | 9/2019 | Zaman | ...................... | B64C 1/40 |

FOREIGN PATENT DOCUMENTS

EP 2832637 A1 * 2/2015 ............ B64C 1/403
FR 2547784 12/1984

OTHER PUBLICATIONS

French Search Report, dated Nov. 9, 2017, priority document.

* cited by examiner

*Primary Examiner* — Jacob J Cigna

(74) *Attorney, Agent, or Firm* — Greer, Burns & Crain, Ltd.

(57) ABSTRACT

To facilitate the thermophonic insulation of an aircraft section, a method comprises engaging first respective parts of flexible structures, respectively connected to two flat mattresses, with a support device, by leaving free respective second parts of the flexible structures arranged at a distance from the first parts, then curving the two mattresses, by virtue of the mutual bringing together of the second parts, then inserting the support device into the aircraft section, and detaching each mattress from the support device and fixing each mattress to an aircraft structure delimiting the aircraft section.

15 Claims, 19 Drawing Sheets

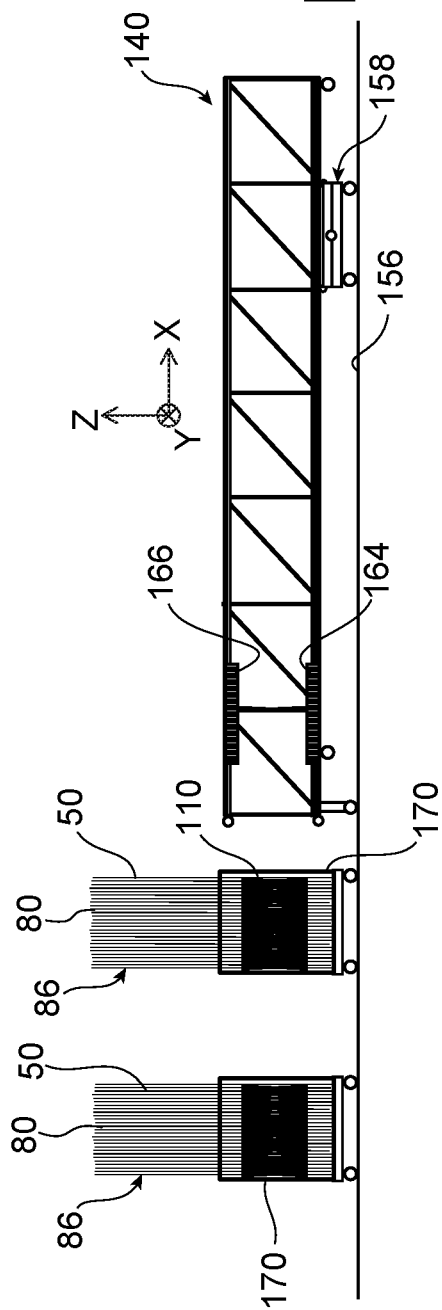

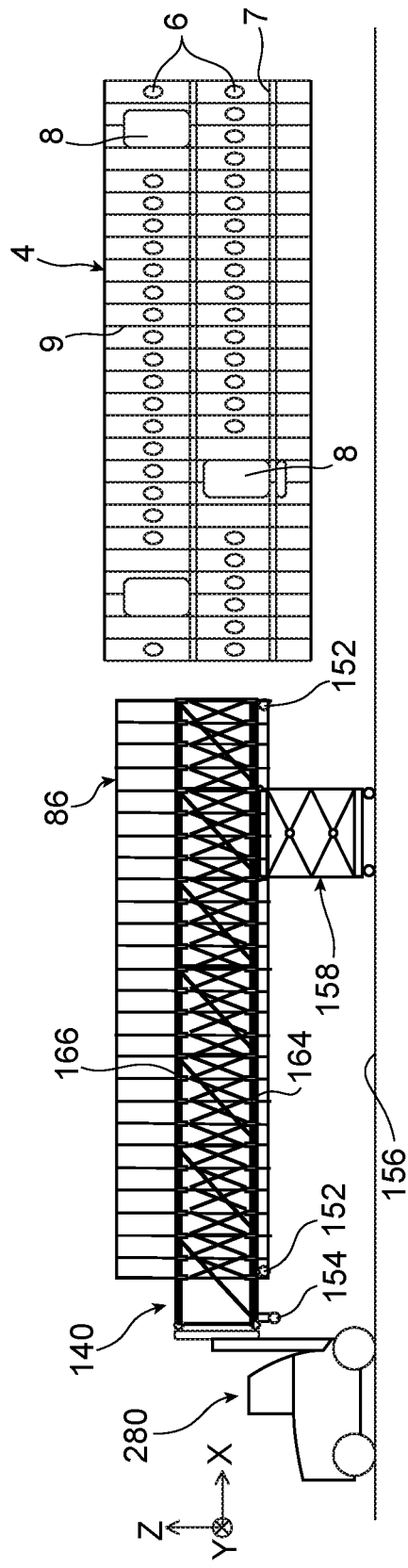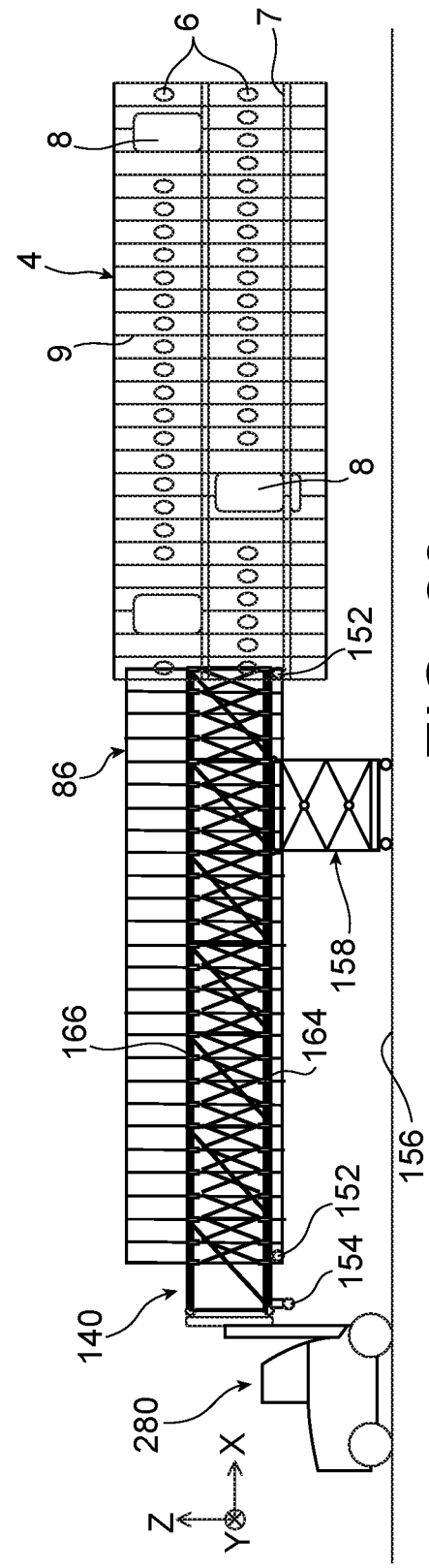

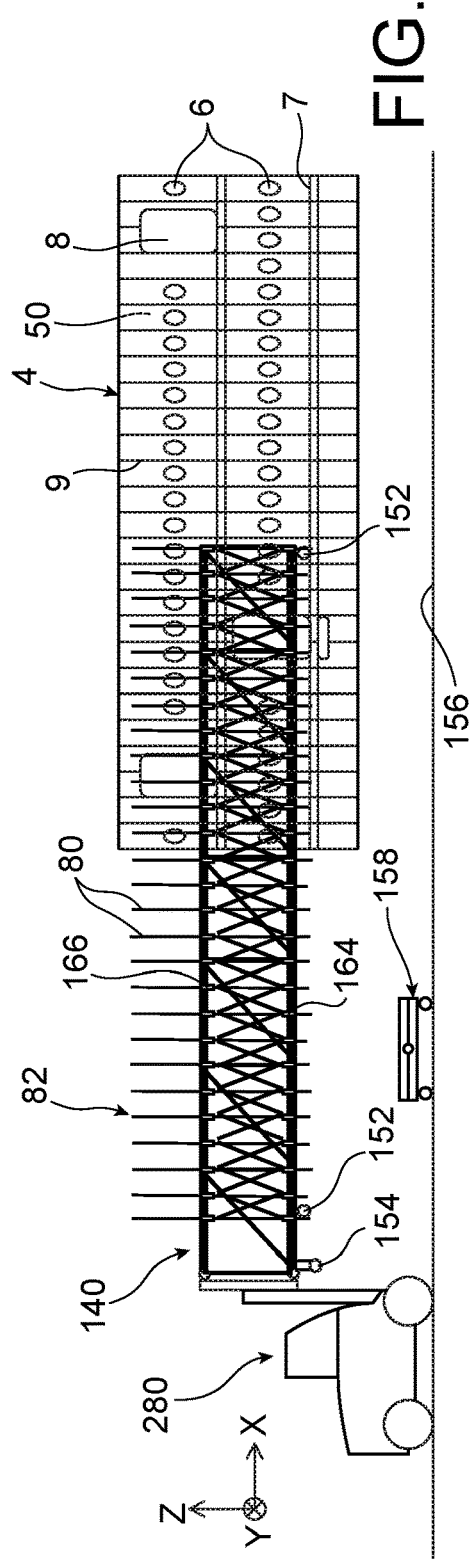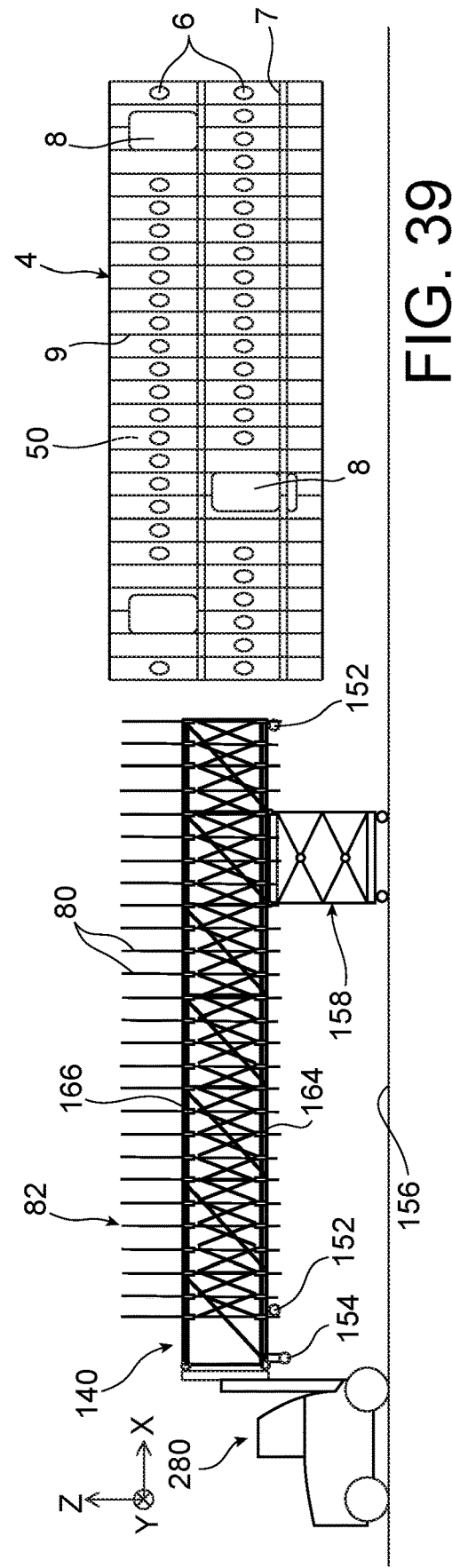

METHOD FOR THERMOPHONICALLY INSULATING AN AIRCRAFT SECTION DESCRIPTION

CROSS-REFERENCES TO RELATED APPLICATIONS

This application claims the benefit of the French patent application No. 1756470 filed on Jul. 7, 2017, the entire disclosures of which are incorporated herein by way of reference.

TECHNICAL FIELD

The present invention relates to the field of thermal and acoustic insulation systems for aircraft and has the general aim of improving the integration of these systems in aircraft, particularly in the cabins of such aircraft.

More specifically, the invention relates to a method for thermophonically insulating an aircraft section.

It is particularly advantageous when it is applied to an aircraft comprising two or more decks.

BACKGROUND OF THE INVENTION

In an aircraft, the purpose of the thermal and acoustic insulation system, also called "thermophonic insulation," is to insulate the aircraft against noises, particularly aerodynamic noises, and against the cold conditions encountered when flying at normal cruising altitudes. The insulation generally relates to the aircraft cabin that is intended to accommodate the crew and the passengers and, more generally, to the entire pressurized part of the aircraft.

In known types of aircraft, the system for thermophonically insulating the cabin is formed by numerous padded panels each assembled on the structure of the aircraft. In a typical medium-haul aircraft, there are therefore approximately three hundred padded panels. The geometries of these panels vary depending on their respective locations inside the aircraft and, for the most part, are generally manually produced and manually integrated into the structure of the aircraft.

The operations for installing the thermophonic insulation system in the aircraft are therefore long and expensive and, moreover, these operations exclusively control the aircraft in the sense that, in general, it is not possible for other operations to be completed on the aircraft during the installation of the thermophonic insulation system.

In terms of increasing aircraft production rates, improving the procedures for integrating thermophonic insulation systems in the aircraft is therefore desirable.

SUMMARY OF THE INVENTION

A concept that is a basis of the invention involves replacing a plurality of padded panels that are used to form a known type of thermophonic insulation system with a pair of mattresses, the mattresses therefore being considerably larger than the padded panels used in the prior art.

This principle offers numerous advantages, including:

time-saving with respect to the installation of a thermophonic insulation system in an aircraft, such saving being particularly advantageous since this operation occurs on the critical path of aircraft assembly methods;

significant weight-saving (for example, of approximately 15%) due to the fact that the known insulation systems require an overlap between their multiple adjacent panels;

money-saving, particularly due to the possibility of automating a significant part of the manufacture of each thermophonic insulation module and due to the reduced time required to complete the thermophonic insulation of an aircraft using such modules;

better thermophonic insulation efficiency due to a significant reduction in leaks and thermal bridges, particularly due to the reduction in the number of borders.

Within this context, a particular aim of the invention is a method for thermophonically insulating an aircraft section, comprising at least the following steps:

providing two mattresses;

fixing a respective flexible structure onto each of the mattresses;

engaging first respective parts of the flexible structures with a support device, while leaving free respective second parts of the flexible structures arranged at a distance from the first parts;

mutually bringing together respective second parts of the flexible structures resulting in bending of the flexible structures and curvature of the mattresses in respective directions orthogonal to a longitudinal direction of each of the mattresses, while the support device retains the first respective parts of the flexible structures one relative to the other in a direction orthogonal to the longitudinal direction;

locking the position of the second parts so as to maintain the flexible structures in a bent conformation and the mattresses in a curved conformation;

inserting the support device supporting the flexible structures respectively secured to the mattresses into the aircraft section;

detaching each of the mattresses from the support device and fixing each of the mattresses to an aircraft structure delimiting the aircraft section; and removing the support device outside the aircraft section.

The method according to the invention thus allows the installation of relatively large thermophonic insulation mattresses on an aircraft structure, so that two mattresses of this type are capable of covering the entire transverse section of a zone to be insulated inside an aircraft.

Such a method is particularly advantageous for thermophonically insulating a double-deck aircraft.

The support device is preferably configured so that, on completion of the step of engaging first respective parts of the flexible structures with the support device, each of the mattresses extends in a vertical direction or a slightly inclined direction relative to the vertical, typically so as to form an angle at less than 15 degrees to the vertical.

The first part of each flexible structure then forms a lower end part, whereas the second part of each flexible structure forms an upper end part.

In preferred embodiments of the invention, each of the mattresses comprises a plurality of window openings.

Preferably, the plurality of window openings comprises at least two rows of window openings intended to be arranged one above the other on the same side of an aircraft cabin.

Preferably, each mattress has a bending angle at least equal to 90 degrees after the step of locking the position of the second parts.

According to other advantageous aspects of the invention, the method comprises one or more of the following features, taken separately or according to all the technically possible combinations:

the step of mutually bringing together the second respective parts of the flexible structures is implemented by pulling on at least one cable cooperating with the second parts;

the step of locking the position of the second parts is implemented by locking the cable relative to one of the flexible structures or by fixing part of the cable to the support device;

each flexible structure comprises battens extending orthogonally to the longitudinal direction of the corresponding mattress and being spaced apart from each other in the longitudinal direction of the corresponding mattress;

the method further comprises, between the step of inserting the support device into the aircraft section and the step of detaching each of the mattresses from the support device, a step of deploying each flexible structure resulting in mutual separation of the corresponding battens in the longitudinal direction of the corresponding mattress, so as to transition each of the mattresses from a compacted configuration to an installation configuration;

the step of engaging first respective parts of the flexible structures with the support device involves respectively engaging first respective end parts of the battens in retention devices movably mounted on the support device;

the mutual separation between the battens in the longitudinal direction of the corresponding mattress inside each of the flexible structures is constrained by at least one synchronization device formed by deformable parallelograms articulated in series one relative to the other and respectively connected to the battens;

the method further comprises, between the step of inserting the support device into the aircraft section and the step of detaching each of the mattresses from the support device, a step of elevating the support device so as to bring together an upper part of each of the mattresses with an upper part of the aircraft structure delimiting the aircraft section;

the step of fixing each of the mattresses to the aircraft structure delimiting the aircraft section comprises fixing each of the mattresses to circumferential fuselage frames belonging to the aircraft structure;

the fixing of each of the mattresses to the circumferential fuselage frames is carried out by means of resilient staples each clamping the corresponding mattress together with a heel of the corresponding circumferential fuselage frame;

the step of fixing flexible structures respectively on the mattress comprises detachably fixing each of the flexible structures on the corresponding mattress, the step of detaching each of the mattresses from the support device comprises detaching each of the mattresses from the corresponding flexible structure, and the step of removing the support device outside the aircraft section comprises removing the flexible structures supported by the support device outside the aircraft section;

the aircraft section is an intermediate fuselage section;

the aircraft section is a fuselage nose cone or a fuselage tail cone;

each of the mattresses has a transverse span that extends from a longitudinal end of the mattress;

the support device comprises a lower floor and an upper floor (146) arranged above and at a distance from the lower floor, and wherein the steps respectively involving mutually bringing together the respective second parts of the flexible structures and of locking the position of the second parts are implemented by at least one operator standing on the upper floor.

BRIEF DESCRIPTION OF THE DRAWINGS

The invention will be better understood, and further details, advantages and features thereof will become apparent upon reading the following description, which is provided by way of a non-limiting example, and with reference to the accompanying drawings, in which:

FIG. 15 is a similar view to that of FIG. 14 showing the introduction of two mattresses in the vicinity of the support device;

FIG. 16 is a view similar to that of FIG. 15 showing a variation of the method, in which the support device integrates a synchronization device;

FIGS. 28 to 31 are schematic side views of the aircraft structure of FIG. 1 and of the support device supporting the two mattresses, during subsequent steps of the method intended to position the mattresses inside the aircraft structure facing a region to be insulated;

FIGS. 38 and 39 are schematic side views of the aircraft structure showing the removal of the support device outside the aircraft section;

DETAILED DESCRIPTION OF THE PREFERRED EMBODIMENTS

As explained above, a concept that is a basis of the invention involves replacing a plurality of padded panels, used to form a known type of thermophonic insulation system intended to thermophonically insulate an aircraft section, with a pair of mattresses, the mattresses therefore being considerably bigger than the padded panels used in the prior art.

Therefore, the invention generally relates to a method allowing such a pair of mattresses to be assembled on an aircraft structure delimiting an aircraft section to be insulated.

Figure 1:
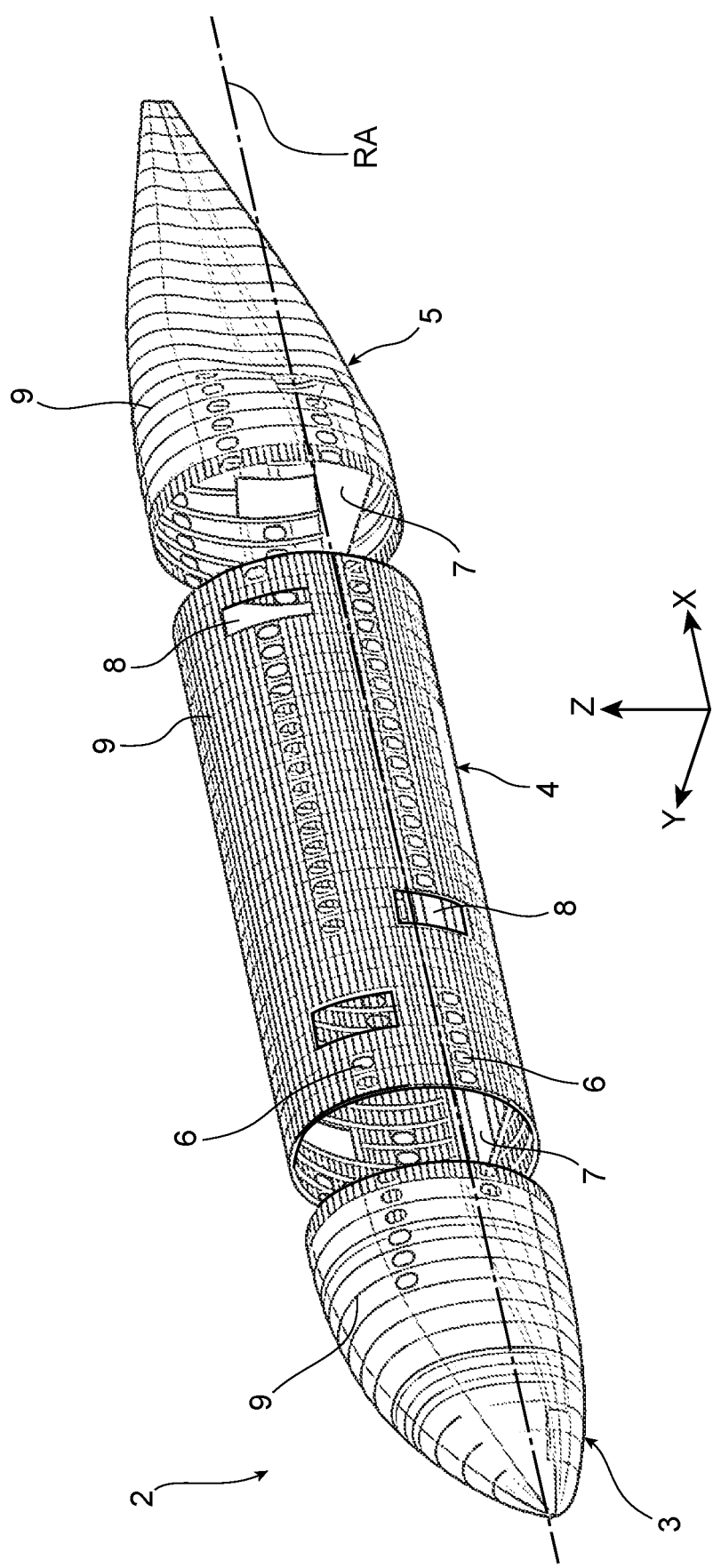
FIG. 1 is a partial perspective schematic view of an aircraft structure delimiting an aircraft section to be insulated and liable to receive thermophonic insulation by means of the method according to the invention.

Throughout the following description, the method according to the invention is applied to the thermophonic insulation of a double-deck aircraft, for which the fuselage 2, shown in FIG. 1, thus forms the aforementioned aircraft structure.

This fuselage comprises three sections, for example, namely a nose cone 3, an intermediate section 4 and a tail cone 5, which each comprise a lower floor 7. In a well-known manner, the nose 3 and tail 5 cones each have a tapered transverse section (due to their curvature in several directions), whereas the transverse section of the intermediate section 4 is substantially constant.

The method according to the invention can be equally applied to any one of or to several of these three fuselage sections and initially will be described with respect to its application to the thermophonic insulation of the aircraft section delimited by the intermediate section 4.

Of course, the intermediate section 4 can be formed by a plurality of sections assembled end-to-end, in which case the method according to the invention is preferably applied to the assembly resulting from assembling these sections, with it being understood that this method can be, by way of a variation, separately applied to each of the sections before they are assembled.

FIG. 1 particularly shows a plurality of circumferential fuselage frames 9 belonging to the fuselage 2.

This fuselage 2 typically comprises, on each of its sides, two superposed rows of window openings 6. In the example shown, each of these rows is interrupted by at least one access door 8.

Throughout the present description, the longitudinal direction X of each mattress is defined as being the direction parallel to the longitudinal direction of the aircraft section equipped with such a mattress, i.e., the direction of the roll axis RA of the aircraft comprising the section. The transverse direction Y is defined as being the direction orthogonal to the longitudinal direction X and to the vertical direction Z of the aircraft. When such a mattress is arranged flat, the transverse direction Y of the mattress corresponds to the direction contained in the plane of the mattress and orthogonal to the longitudinal direction X, whereas the vertical direction Z corresponds to the direction of the thickness of the mattress.

FIGS. 2 to 7 show steps of manufacturing a mattress that can be implemented prior to the thermophonic insulation method according to the invention, in order to provide two mattresses that can be used within the scope of this method according to the invention. Nevertheless, the manufacture of the mattresses can be implemented according to other techniques without departing from the scope of the invention.

Figure 2:
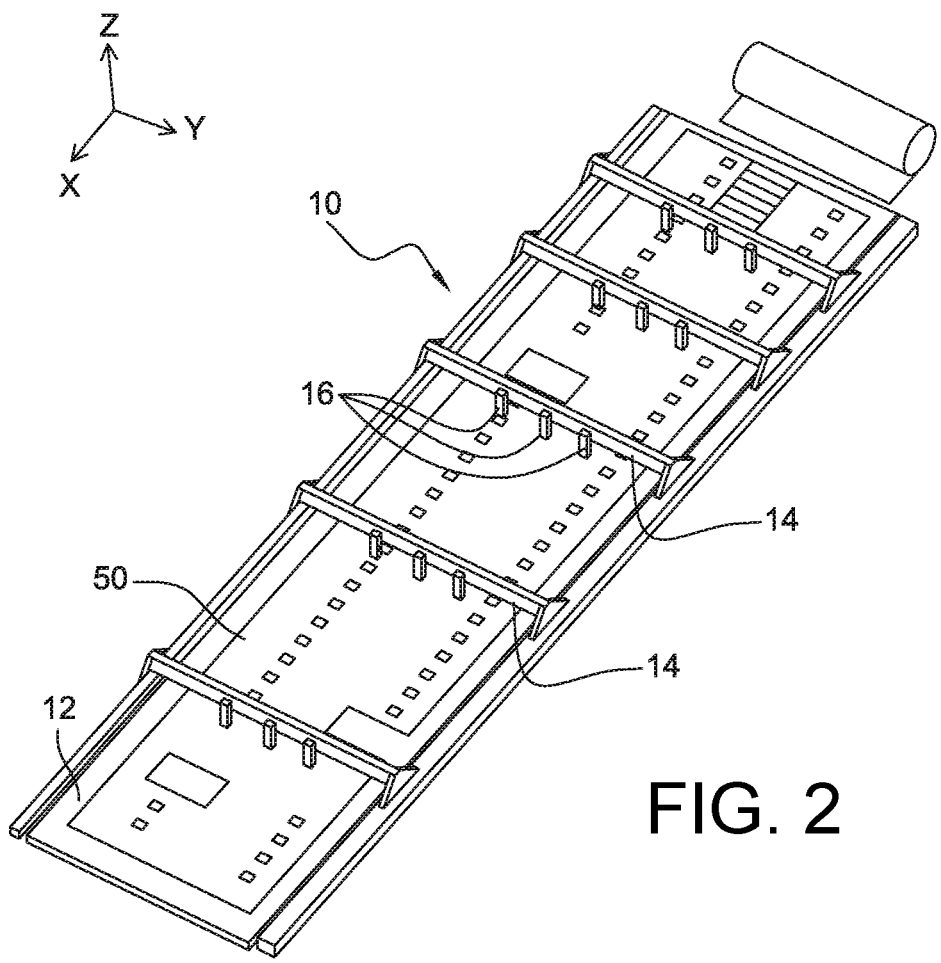
FIG. 2 is a perspective schematic view of a machine allowing automated implementation of the steps of manufacturing a mattress intended to be implemented in the method according to the invention.

FIG. 2 schematically shows a machine 10 adapted for automated implementation of steps of a method for manufacturing each of the two mattresses.

To this end, the machine 10 comprises a large support plate 12, for example, larger than a semi-cylindrical half-portion of a double-deck aircraft fuselage section in a flat arrangement, so that the support plate 12 allows such a mattress to be supported.

The machine 10 further comprises gantries 14 provided with numerical control tooling 16, dedicated, for example, to operations for deploying reels of film and reels of insulating material, and to cutting, welding, seaming, marking and mattress handling operations.

It is clear to a person skilled in the art that the configuration of the machine 10 can be easily adapted to the configuration of the thermophonic insulation mattress to be manufactured, which depends on the configuration of the aircraft section to be insulated.

The mattress is produced from a plain mattress, which is manufactured by superposing layers of insulating material and of wrapping film.

Figure 3:
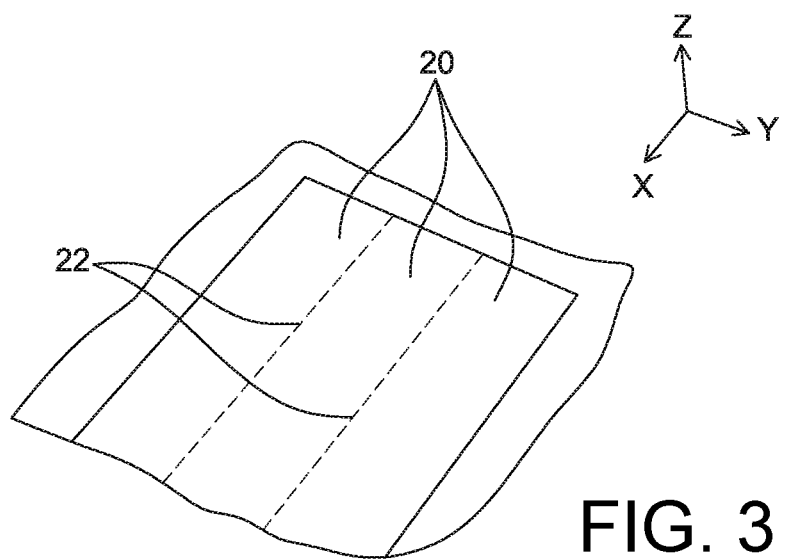
FIGS. 3 and 4 are partial perspective schematic views of a plain mattress during a step of producing this plain mattress.

These layers can be formed by assembling, for example, by heat-sealing, layers of material 20 narrower than the width of the mattress to be manufactured, connected along longitudinal lines 22 (FIG. 3).

By way of a variation, at least some of the layers of material forming the plain mattress can be formed directly from reels that are the full width of the mattress to be manufactured, as explained hereafter.

Figure 4:
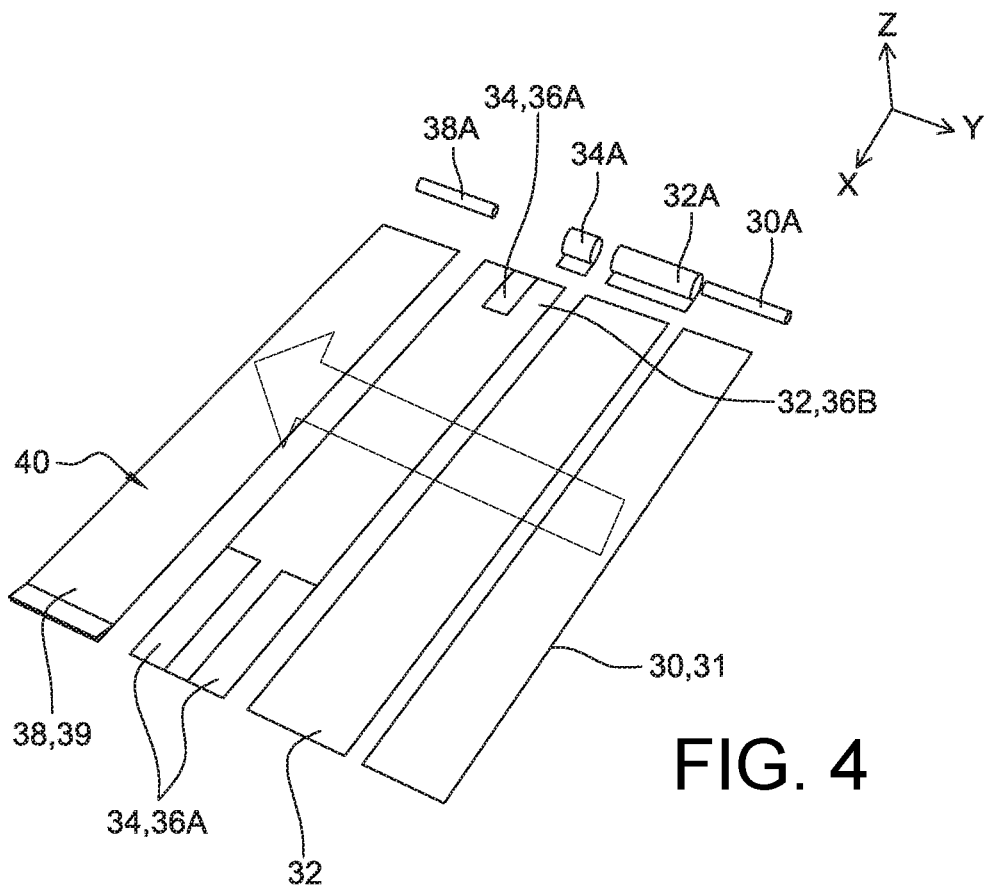
Figure 5:
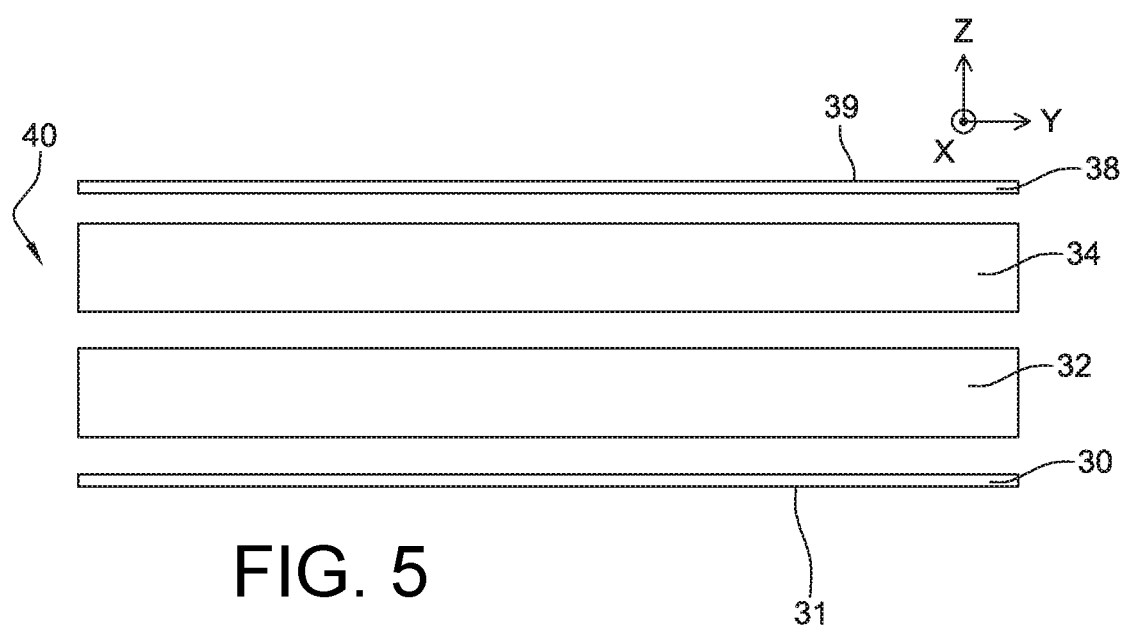
FIG. 5 is an exploded section view of the plain mattress of FIGS. 3 and 4.
Figure 6:
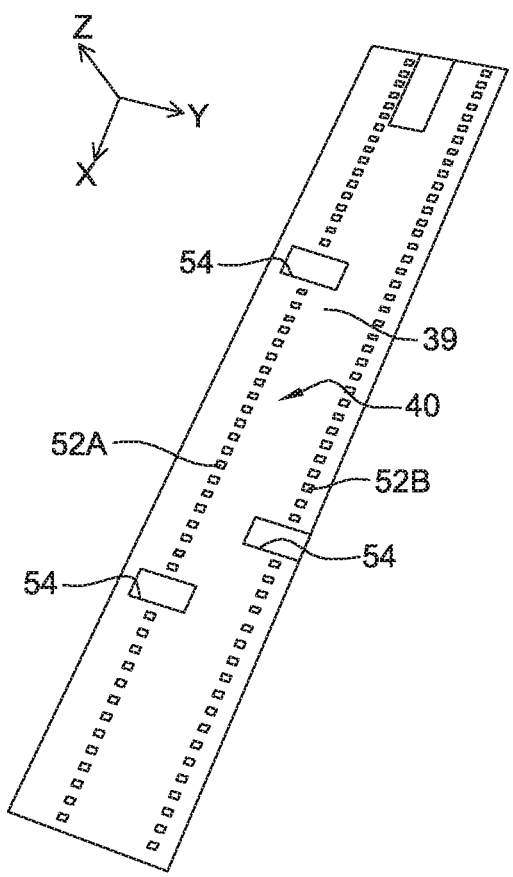
FIGS. 6 to 8 are partial perspective schematic views of a mattress during a step of producing this mattress from the plain mattress of FIGS. 3 to 5.
Figure 7:
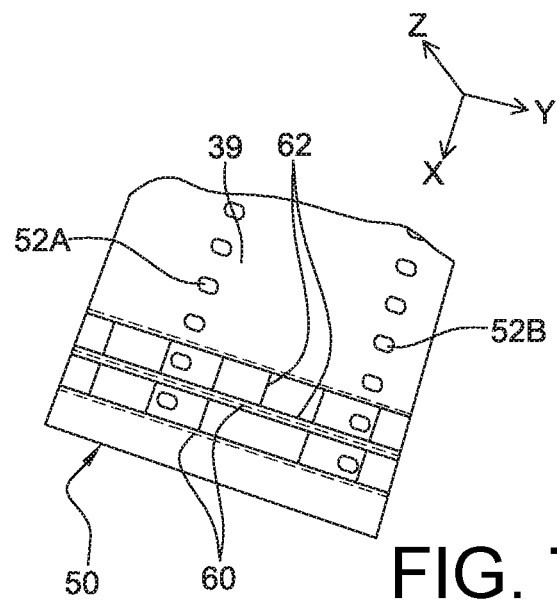

FIG. 4 shows a step of producing the plain mattress and shows, from right to left:

an outer film 30 intended to form an outer surface 31 of the plain mattress;

the result of a step of depositing a first layer of thermophonic insulation 32 onto the outer film 30;

the result of a subsequent step of depositing a second thermophonic insulation layer 34 onto first zones 36A of the first thermophonic insulating layer 32, while leaving one or more second zones 36B of the first thermophonic insulating layer 32 uncovered by the second thermophonic insulating layer 34; and the plain mattress 40, also shown as an exploded transverse section view in FIG. 5, obtained on completion of a subsequent step of depositing an inner film 38 onto the second thermophonic insulating layer 34 and onto the second zones 36B of the first thermophonic insulating layer 32. The inner film 38 is intended to form an inner surface 39 of the plain mattress.

Each of the layers 30, 32, 38 is obtained from a corresponding full width reel 30A, 32A, 38A (FIG. 4), whereas the second thermophonic insulating layer 34 is deposited in the form of narrower strips, formed from a reel 34A with a corresponding width.

Depositing the second thermophonic insulating layer 34 onto the first zones 36A of the first thermophonic insulating layer 32 provides these zones with enhanced insulation properties relative to the second zones 36B. The method thus allows the requirement to be met for locally enhanced insulation zones that is common in aircraft and which, in the prior art, is met through the use of padded panels with different insulation levels.

The manufacturing method subsequently comprises a step of producing a mattress 50 on the basis of the plain mattress 40, resulting in the implementation of finishing operations applied to the plain mattress.

These finishing operations comprise, for example, the production of two rows of window openings 52A, 52B (FIG. 6), disposed on two opposite lateral sides of the mattress, and of a plurality of aircraft cabin door openings 54 inside the plain mattress.

The finishing operations generally comprise operations for cutting outer profiles and inner profiles of the mattress, operations for fusing the outer film 30 with the inner film 38 in order to close the mattress in a sealed manner in the vicinity of the outer and inner profiles. These operations also preferably comprise operations for producing padding studs housed between the inner and outer films in order to prevent any deformation of the insulating layers 32, 34.

The finishing operations can further comprise the production of markings on the inner surface 39 (FIG. 7), which advantageously include transverse markings 60 coinciding with the location provided for the contact between the mattress and the circumferential fuselage frames of the aircraft, as will become more clearly apparent hereafter. Other markings 62 can be used to locate pre-cut zones with a view to facilitating any subsequent repairs of the mattress or to mark locations intended to be perforated in order to allow the passage of supports for various aircraft systems. With respect to any subsequent repairs of the mattress, a damaged zone actually can be removed by following the pre-cut markings, which ensures that the dimensions of the removed part are known in advance. Thus, a range of repair kits simply needs to be available with the dimensions of the zones delimited by the pre-cut markings in order to provide maintenance for the whole mattress.

As soon as two mattresses 50 are produced according to the aforementioned method, these two mattresses 50 are made available in order to be used within the scope of the thermophonic insulation method according to the invention. The two mattresses are produced so as to have respective configurations adapted to the subsequent arrangement of the mattresses, respectively on two opposite sides of the aircraft fuselage.

The thermophonic insulation method according to the invention comprises a step of fixing a respective flexible structure onto each of the two mattresses 50.

Figure 8:
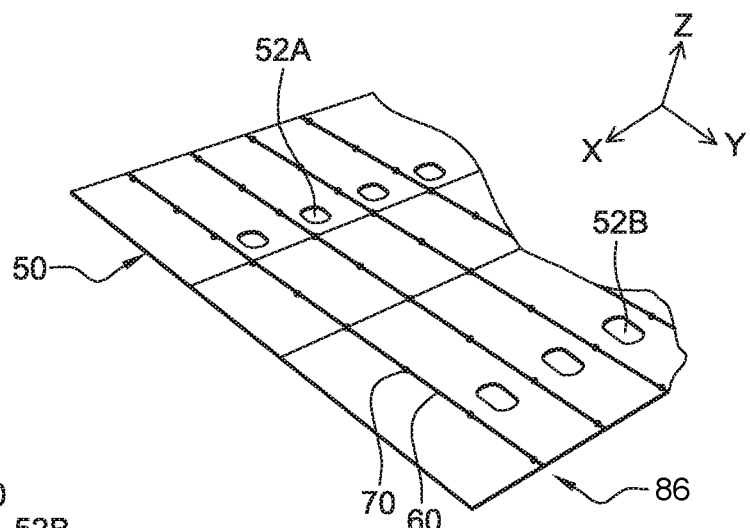

This step initially comprises fixing reversible fixing devices 70 onto each mattress 50 (FIG. 8). These devices 70 each form, for example, the looped part or the hooked part of a hook and loop device. These devices 70 are advantageously placed along the aforementioned markings 60.

Subsequently, for each of the mattresses 50, the method comprises fixing the flexible structure 82 onto the mattress.

Figure 9:
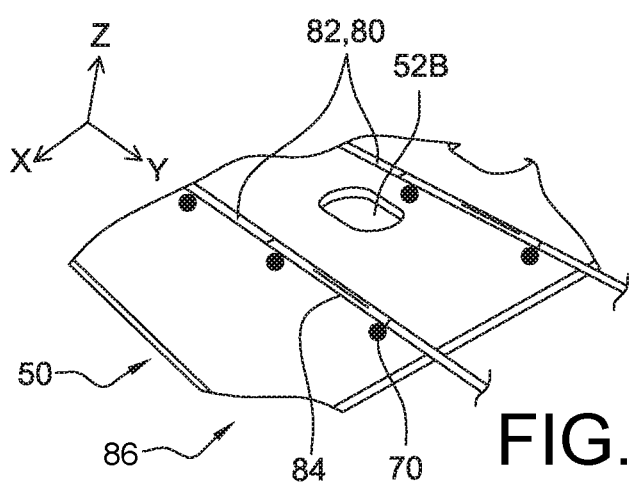
FIG. 9 is a partial perspective schematic view of the mattress showing a step of fixing battens forming a flexible structure on the mattress.

In preferred embodiments of the invention, each flexible structure 82 is formed by a plurality of battens 80 that are independent of each other and are fixed onto the mattress by means of reversible fixing devices 70 (FIG. 9). Of course, to this end, the battens comprise the other parts (with hooks or loops) allowing hook and loop devices to be formed in association with the devices 70.

The battens 80 are preferably formed by hollow tubes made of composite material or, by way of a variation, can have a flattened shape.

For each of the mattresses 50, the corresponding flexible structure 82 (formed by the battens 80 fixed onto the mattress) is thus detachably fixed to the mattress. Furthermore, the battens 80 are thus disposed along the aforementioned markings 60, parallel to the transverse direction Y of the mattress and spaced apart from each other in the longitudinal direction X.

The assembly formed by each mattress 50 and the flexible structure 82 fixed thereto form a corresponding thermophonic insulation module 86, according to the terminology of the present invention.

Figure 10:
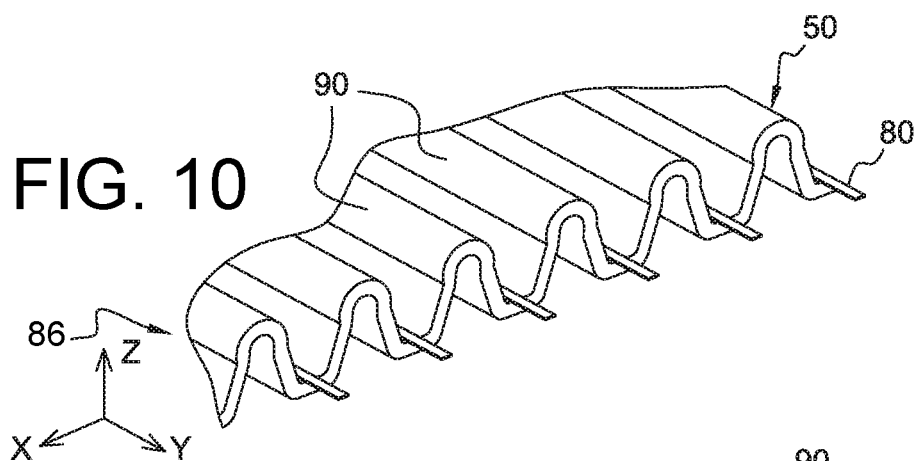
FIGS. 10 and 11 are perspective schematic views of part of the mattress and battens showing a step of compacting the mattress.
Figure 11:
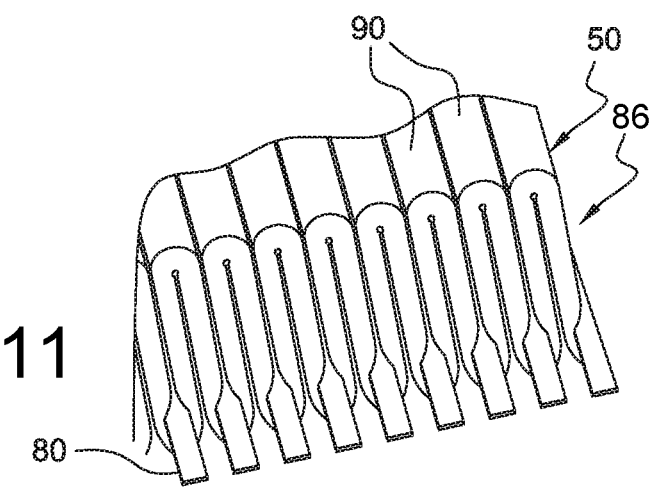

The method subsequently preferably comprises a step of compacting each mattress 50. For each of the mattresses, this step involves, on the one hand, lifting segments 90 of the mattress each located between two corresponding consecutive battens 80, so that the mattress is of corrugated conformation in the longitudinal direction X (FIG. 10) and, on the other hand, bringing together the segments 90 and bringing together the battens 80, resulting in the compression of the segments 90, so as to reduce the bulk of the mattress in the longitudinal direction X (FIG. 11). The reduction in the bulk of the mattress according to this method typically reaches a factor of 10.

As is the case for the preceding operations, the compacting operations are advantageously suitable for automated implementation.

The thermophonic insulation module 86 can then possibly be stored pending its use within the scope of the subsequent steps of the method.

In a preferred embodiment of the invention, the method subsequently comprises a step of linking the battens 80 of each of the flexible structures 82 to at least one respective synchronization device 110 (FIG. 12), connecting the battens 80 to each other so as to synchronize the movements of the battens relative to each other in the longitudinal direction X, as will become more clearly apparent hereafter.

In the example shown, the battens 80 of each of the flexible structures 82 are connected to a single respective synchronization device 110.

The synchronization devices 110 are each formed by a plurality of deformable parallelograms 112 articulated in series with each other and respectively connected to the corresponding battens 80.

Each synchronization device 110 is thus formed by two assemblies 114A, 114B of rods mounted end-to-end, while being articulated with each other via their respective ends, with the rods of the first assembly 114A also being articulated on the rods of the second assembly 114B via their respective centers, so as to form the plurality of deformable parallelograms 112, as will become more clearly apparent hereafter.

Figure 12:
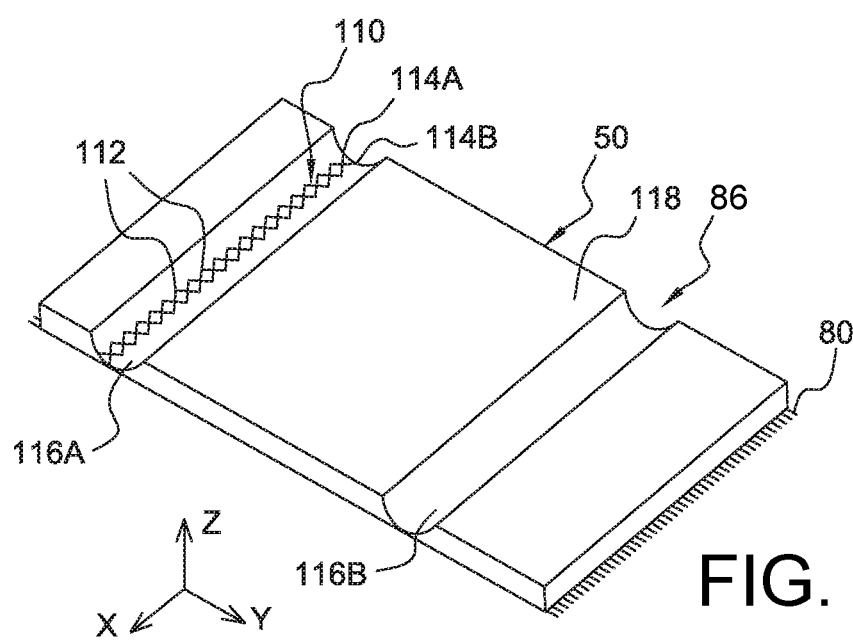
FIG. 12 is a partial perspective schematic view of the mattress and battens showing a step of connecting battens to a synchronization device.

As shown in FIG. 12, which shows one of the two mattresses, each synchronization device 110 is advantageously arranged in one of the longitudinal recesses 116A, 116B respectively formed by the two rows of window openings 52A, 52B in the upper surface 118 of the corresponding compacted mattress.

The step of linking the battens 80 to the synchronization devices 110 can, by way of a variation, be implemented before the step of compacting the mattress 50.

Figure 13:
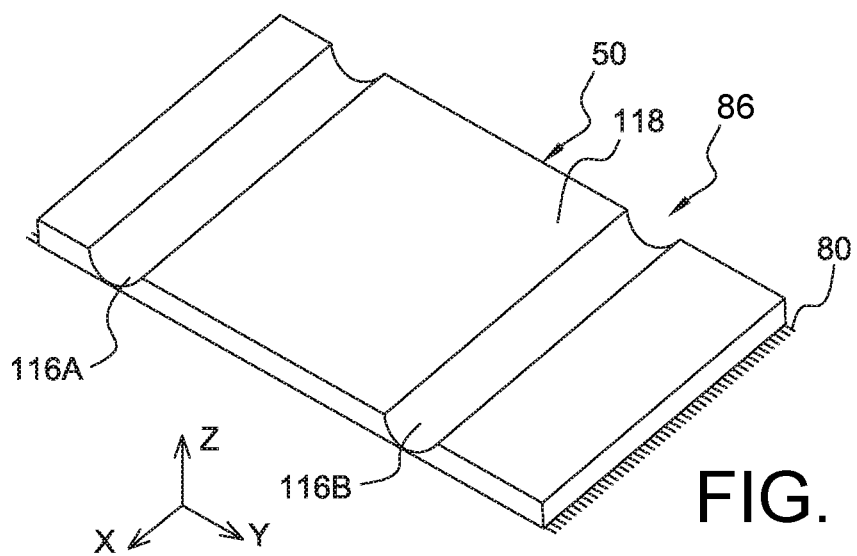
FIG. 13 is a partial perspective schematic view of the mattress and battens in a variation of the method, in which the battens are not connected to a synchronization device at this stage.

In other preferred embodiments of the invention, the battens 80 of each of the flexible structures 82 are not connected to such a respective synchronization device at this stage of the method, so that each of the mattresses is found in the state shown in FIG. 13.

Figure 14:
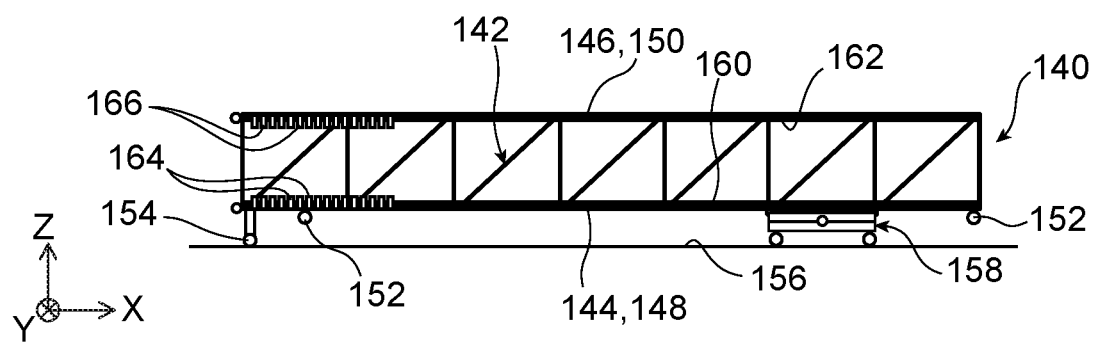
FIG. 14 is a side schematic view of a support device intended to be implemented in the method according to the invention.

FIG. 14 shows a side view of a support device 140 intended for the implementation of the following steps of the method according to the invention.

This support device 140 is, for example, basically formed by a lattice structure 142, advantageously provided with a lower floor 144 and an upper floor 146, respectively supported by a lower frame 148 and an upper frame 150 of the lattice structure 142.

The lattice structure 142 is also advantageously provided with main castors 152 intended to move the support device on a floor of the aircraft section to be insulated, in this case the lower floor 7 (not shown in FIG. 14). The lattice structure 142 is also provided with additional castors 154, by which the support device rests on a floor 156 of a workshop. These additional castors 154, which are configured to maintain the lattice structure 142 higher than the main castors 152 would, are disposed, for example, at a longitudinal end of the lattice structure 142 and are used in association with an additional movable support 158, on which another part of the lattice structure 142 rests.

The support device 140 also comprises two lower rails 160 respectively extending along two lower lateral longitudinal bars, respectively forming two lateral sides of the lower frame 148, and two upper rails 162, respectively extending along two upper lateral longitudinal bars, respectively forming two lateral sides of the upper frame 150.

First retention devices 164 are movably mounted on each of the lower rails 160 of the support device 140, whereas second retention devices 166 are movably mounted on each of the upper rails 162 of the support device, as will become more clearly apparent hereafter. The configuration of these retention devices 164 and 166 will be described hereafter with reference to FIGS. 22 and 23.

FIG. 15 shows the introduction of the two thermophonic insulation modules 86, obtained on completion of the preceding steps, in the vicinity of the support device 140. The two thermophonic insulation modules 86 are placed, for example, on respective carriages 170 that can move on the floor 156 of the workshop.

FIG. 16 shows the same step, in the case of the variation of the method already referred to with reference to FIG. 13, in which the battens have not been connected to a synchronization device.

In this case, two synchronization devices 110 of the type described above are preferably previously integrated into the support device 140, respectively on each side thereof (FIG. 16). More specifically, each deformable parallelogram 112 is connected to a first corresponding retention device 164 and to a second corresponding retention device 166. Thus, each of the synchronization devices 110 allows the movements of the first retention devices 164 and the second retention devices 166 to be synchronized to each other, and particularly allows an identical separation to be maintained between the retention devices 164, on the one hand, and between the second retention devices 166, on the other hand.

Figure 17:
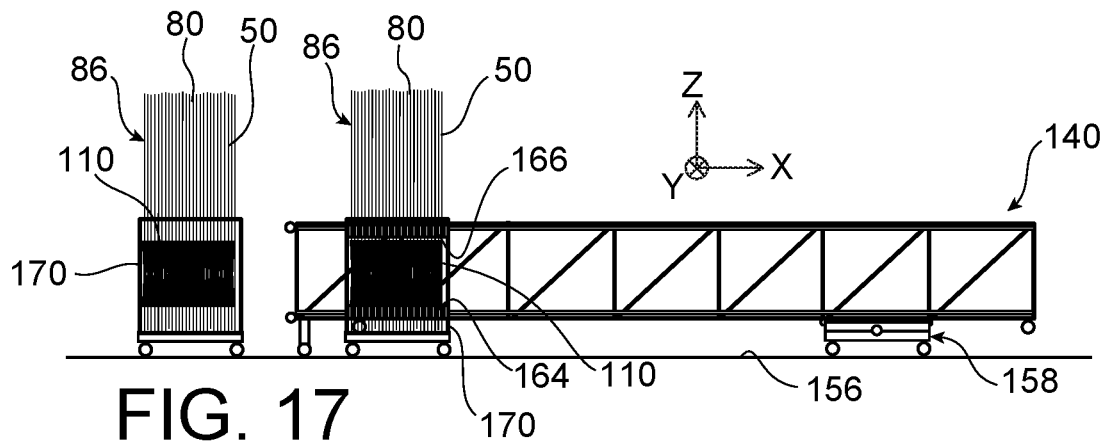
FIGS. 17 to 20 are views similar to that of FIG. 14 showing a sequence of steps for installing the two mattresses of FIG. 15 on the support device of FIG. 14.
Figure 18:
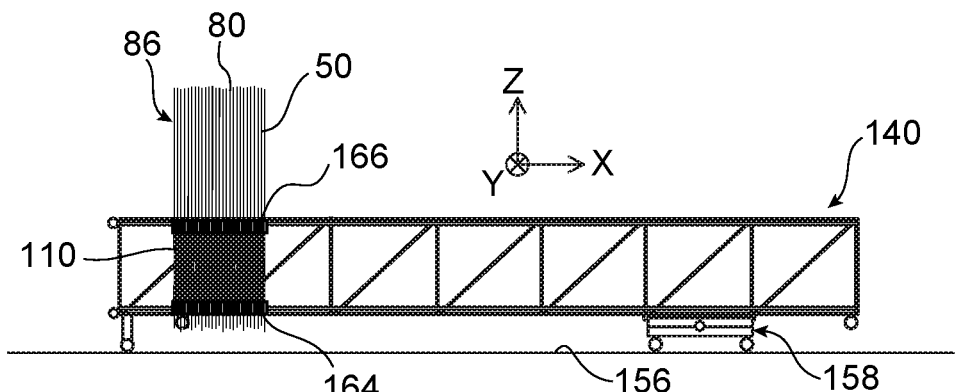

FIGS. 17 and 18 show the successive installation of each of the thermophonic insulation devices 86 on the support device 140, involving engaging first respective parts of the flexible structures with the support device 140. It is to be noted that one of the modules is hidden by the other in FIG. 18.

More specifically, for each of the thermophonic insulation modules 86, it involves engaging respective lower ends of the battens 80 forming the flexible structure 82 of the module with the first retention devices 164, respectively, and engaging respective midpoint portions of the battens 80 with the second retention devices 166, respectively, as will become more clearly apparent hereafter.

According to the terminology relating to the preferred embodiment of the present invention, the first part of each flexible structure 82 is defined as being formed by first respective end parts of the corresponding battens 80 extending from the lower ends of the battens 80 (inclusive) up to the midpoint portions of the battens 80 (also inclusive).

Figure 19:
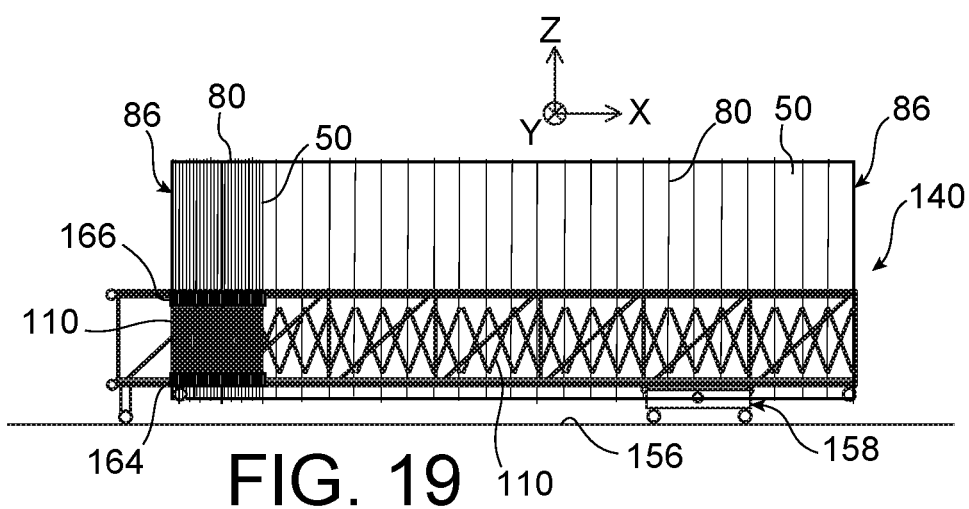
Figure 20:
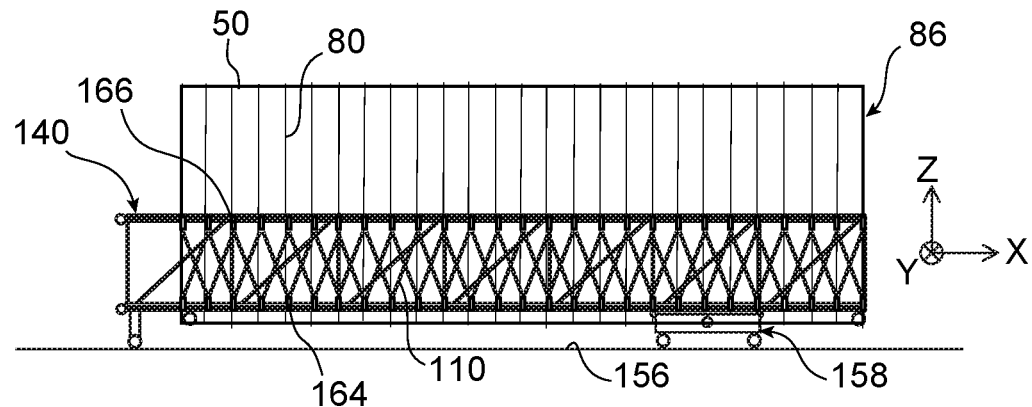

In the event that each of the mattresses 50 has been previously compacted, as described above with reference to FIGS. 10 and 11, the method subsequently comprises the successive deployment of each of the mattresses, as shown in FIGS. 19 and 20. To this end, an operator manipulates each of the synchronization devices 110 so as to cause the extension thereof in the longitudinal direction X and to thus cause a mutual separation between the battens 80 inside each of the flexible structures 82.

FIG. 19 thus shows a first one of the thermophonic insulation modules 86 in the compacted configuration, on the first plane, whereas the other one of the modules visible in the background has been deployed so as to adopt an installation configuration. FIG. 20 shows the first thermophonic insulation module 86 after the module has also been deployed in its installation configuration.

Figure 21:
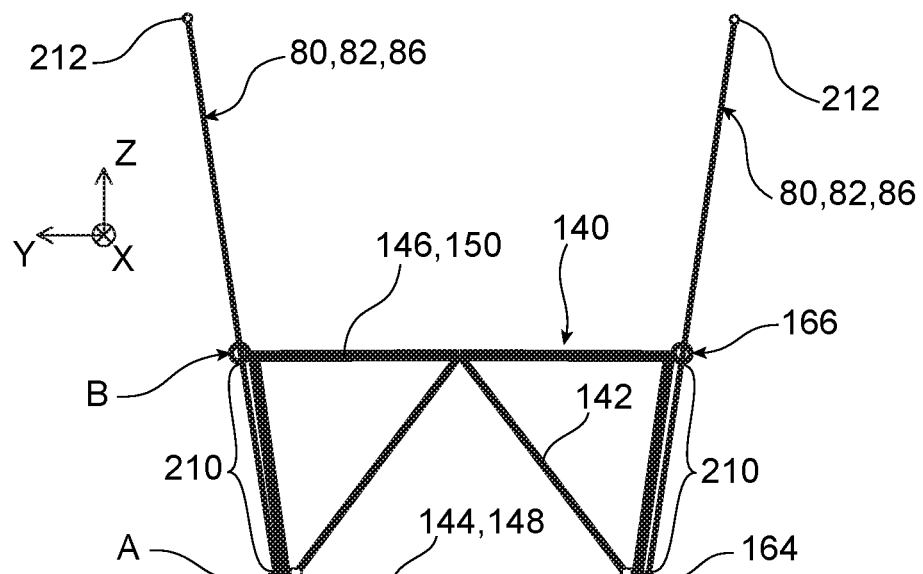
FIG. 21 is a schematic transverse section view of the support device supporting the two mattresses on completion of the preceding steps.

FIG. 21 is a transverse section view of the support device 140 supporting the two thermophonic insulation modules 86.

As will become more clearly apparent from this figure, the cooperation between each flexible structure 82 and the support device 140 allows two particular parts to be distinguished inside each of the flexible structures: the first aforementioned part 210, formed by the first respective end parts of the battens 80 extending from the lower ends to the midpoint portions of the battens, and for which the support device 140 is intended to limit movement during subsequent steps of the method, and a second part 212 formed by respective free upper ends of the battens 80.

Figure 22:
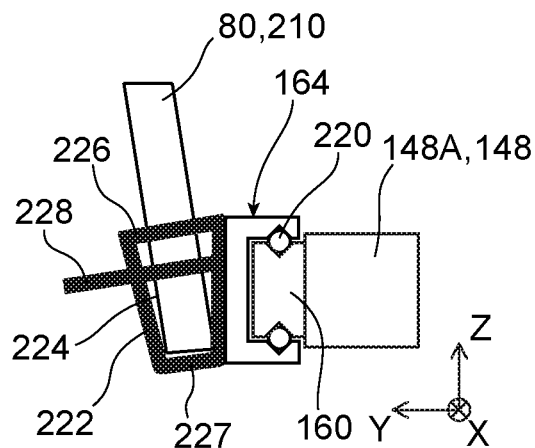
FIGS. 22 and 23 are larger scale views of parts A and B, respectively, of FIG. 21.
Figure 23:
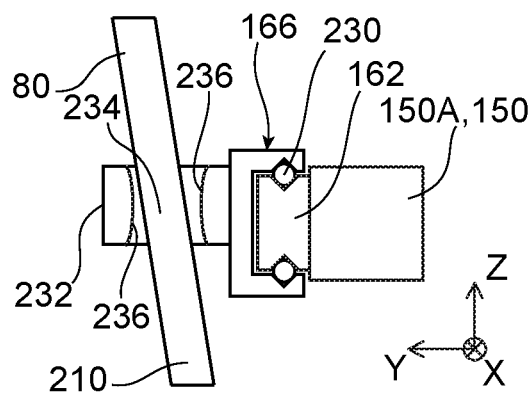

FIGS. 22 and 23 show a first retention device 164 and a second retention device 166, respectively, in greater detail, which devices are respectively arranged in regions A and B of FIG. 21.

FIG. 22 more specifically shows one of the lower longitudinal bars 148A forming the lateral sides of the lower frame 148, on which the corresponding lower rail 160 is fixed, as well as one of the first retention devices 164, mounted to slide on the lower rail 160, for example, by means of a recirculating ball bearing pack 220.

The first retention device 164 comprises a receptacle 222 shaped to receive the lower end 224 of a batten 80. The receptacle 222 thus comprises an upper end 226 provided with an opening, by which the lower end 224 of the batten 80 can be inserted into the receptacle, and a closed lower end 227 to prevent the batten 80 from falling. The receptacle 222 and the batten 80 are also configured to together receive a wedge 228 allowing any movement of the batten 80 in the vertical direction to be blocked, thus ensuring the retention of the batten 80 in the first retention device 164.

FIG. 23 shows one of the upper longitudinal bars 150A forming the lateral sides of the upper frame 150, on which bar the corresponding upper rail 162 is fixed, as well as one of the second retention devices 166, mounted to slide on the upper rail 162, for example, by means of a recirculating ball bearing pack 230.

The second retention device 166 comprises a fastener 232 configured to be able to transition from an open state, allowing the aforementioned midpoint portion 234 of the batten 80 to be engaged in the fastener 232, to a closed state, allowing the retention of the fastener 232 to be ensured around the batten 80 with a clearance. To this end, the fastener 232 can be configured like a spring hook, for example.

Furthermore, the fastener 232 preferably has an inner surface 236, disposed facing the batten 80, having a rounded configuration when it is viewed as a section view, the advantage of which will become more clearly apparent hereafter.

Figure 24:
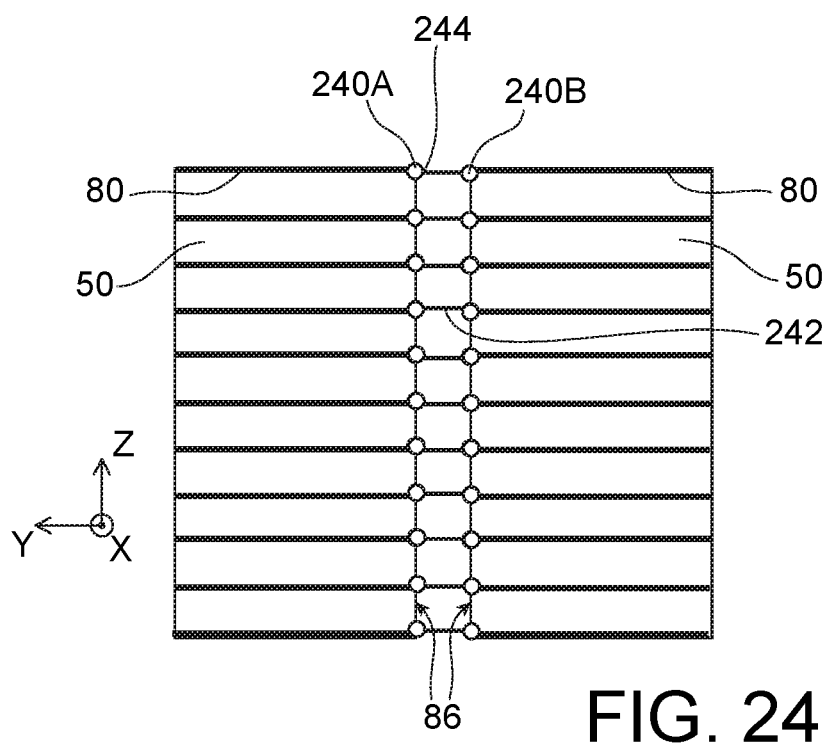
FIGS. 24 and 25 respectively show a schematic top view in a flat arrangement and a schematic transverse section view of the two mattresses supported by the support and equipped with a plurality of cables.

FIG. 24 shows a subsequent step of the method, involving pairwise connection of the respective upper ends 240A of the battens 80 of one of the thermophonic insulation modules 86 to the respective upper ends 240B of the battens 80 of the other opposite thermophonic insulation module 86, by means of cables 242. The term "cable" is herein understood in its broadest sense, particularly covering any type of rope, wire, chain, etc.

For example, the cables 242 each can be fixed by one of their ends 244 to the upper ends 240A of the battens 80 of one of the thermophonic insulation modules 86 and can be respectively engaged in pulleys that are arranged opposite, respectively at the respective upper ends 240B of the battens 80 of the other thermophonic insulation module 86. In this way, the other end of each of the cables 242 (not shown in FIG. 24) is free.

Figure 25:
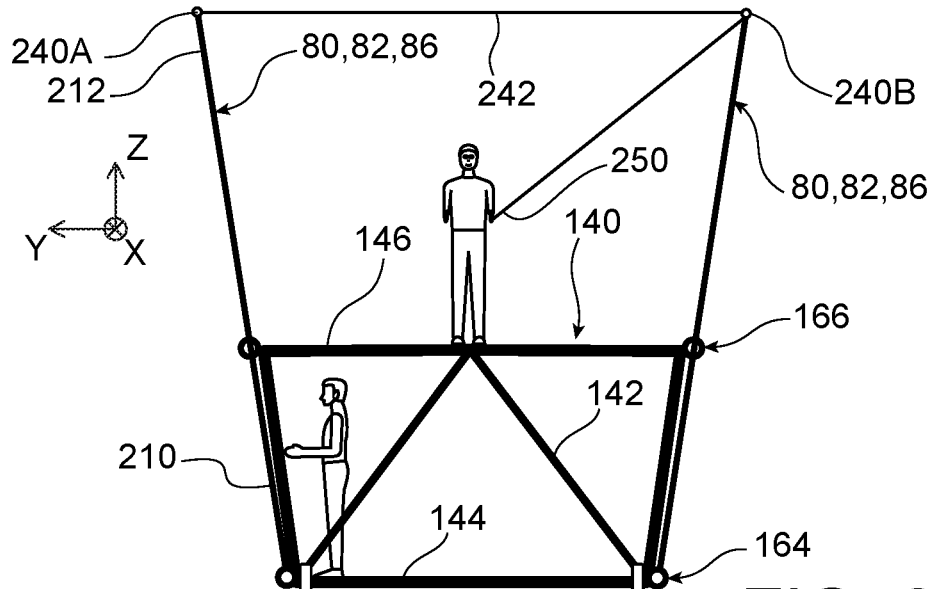
Figure 26:
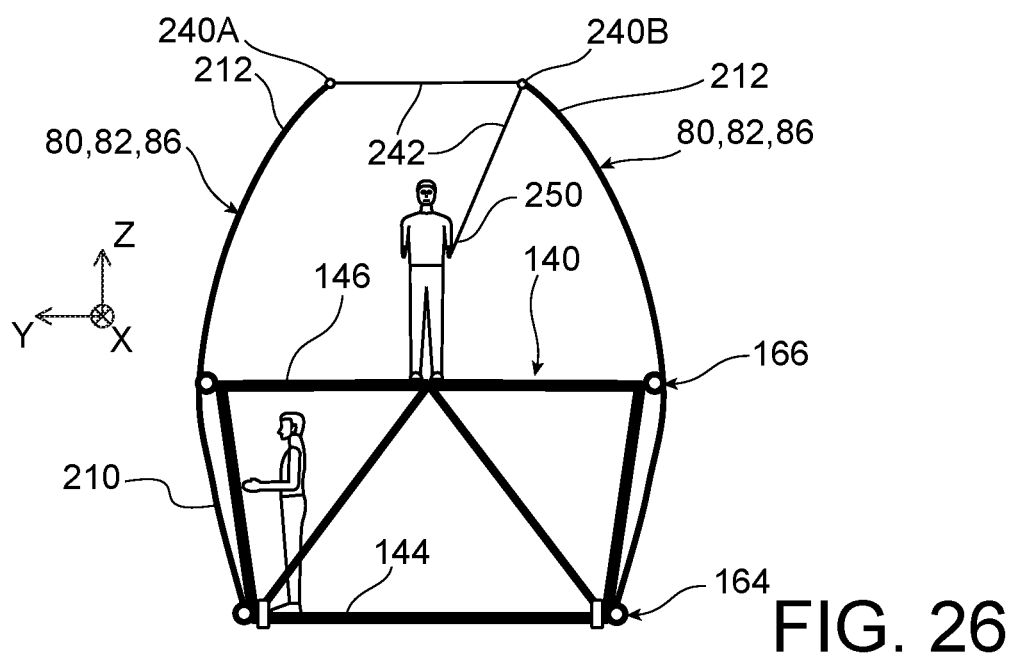
FIGS. 26 and 27 are similar views to that of FIG. 25 showing two subsequent steps of the method intended to conform the two mattresses in a suitable manner for their subsequent fixing to the aircraft structure of FIG. 1.

FIGS. 25 and 26 show a subsequent step of the method, in which an operator grabs the free end 250 of each of the cables 242 and pulls the end downwards so as to pairwise mutually bring together the upper ends 240A and 240B of the battens 80 and thus cause the battens 80 to bend and the mattresses 50 to curve in respective curvature directions orthogonal to the longitudinal direction X. To this end, the operator stands on the upper floor 146 of the support device 140.

More generally, this step therefore involves mutually bringing together the respective second parts 212 of the flexible structures 82, while the support device retains the first respective parts 210 of the flexible structures 82 one relative to the other in the transverse direction Y of the support device 140, corresponding to the transverse direction Y of the aircraft during subsequent steps of the method, as will become more clearly apparent hereafter. The support device 140 actually maintains a substantially fixed pairwise separation between the lower ends 224 of the battens (FIG. 22), on the one hand, and this support device maintains a substantially fixed pairwise separation between the midpoint portions 234 of the battens (FIG. 23), on the other hand.

By way of a variation, the cables 242 can each have two opposite ends respectively fixed to two respective upper ends 240A, 240B of facing battens 80. The step of bringing together the respective second parts 212 of the flexible structures 82 in this case can be implemented, for example, by pulling on a single additional cable cooperating with respective midpoint portions of the cables 242, so as to exert downwards traction on the respective midpoint portions of the cables 242.

During this step of bringing together the second parts 212, the rounded shape of the inner surface 236 of the fastener 232 of each of the second retention devices 166 (FIG. 23) facilitates the bending of the battens 80.

Figure 27:
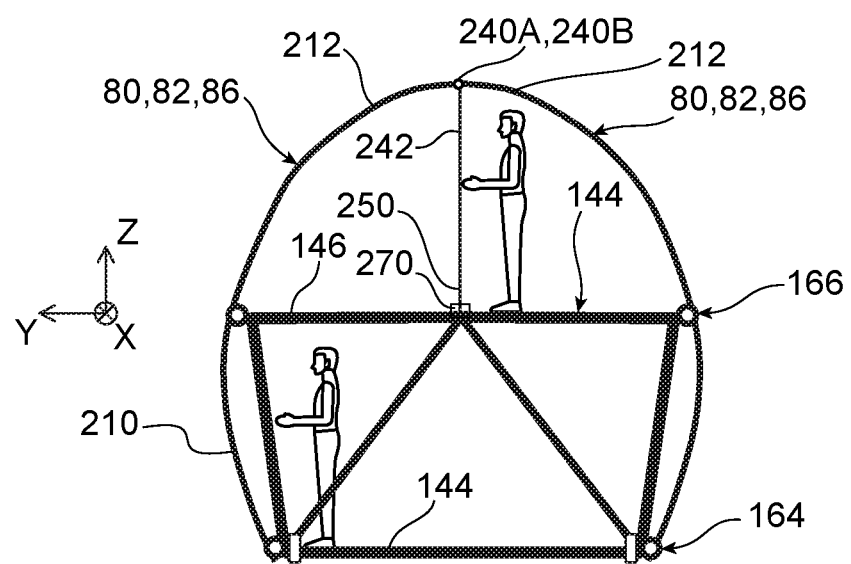

FIG. 27 shows a subsequent step of the method, involving locking the position of the respective second parts 212 of the flexible structures 82, so as to maintain the flexible structures 82 in a bent conformation and the mattresses 50 in a curved conformation.

This step is implemented when the second respective parts 212 of the flexible structures 82 have been sufficiently brought together so that the conformation of the mattresses 50 substantially corresponds to the conformation they are intended to adopt inside the aircraft section to be insulated.

In the preferred embodiment of the invention, this involves, for example, attaching the free end of each cable 242 to attachment components 270 provided to this end on the upper floor 146.

By way of a variation, each of the aforementioned pulleys can be associated with a locking device borne by the corresponding batten, for example, of the snatch-block type. In this case, the aforementioned step involves locking each cable 242 relative to the corresponding flexible structure 82.

FIGS. 28 to 31 show a subsequent step of the method, involving inserting the support device 140 supporting the flexible structures 82 that are respectively secured to the mattresses 50 into the aircraft section to be insulated, in this case into the space delimited by the fuselage section 4.

To this end, the support device 140 is, for example, elevated by means of a forklift truck 280 at the longitudinal end of the support device where the additional castors 154 are arranged, resulting in the deployment of the additional movable support 158 in an upper configuration (FIG. 28).

Figure 30:
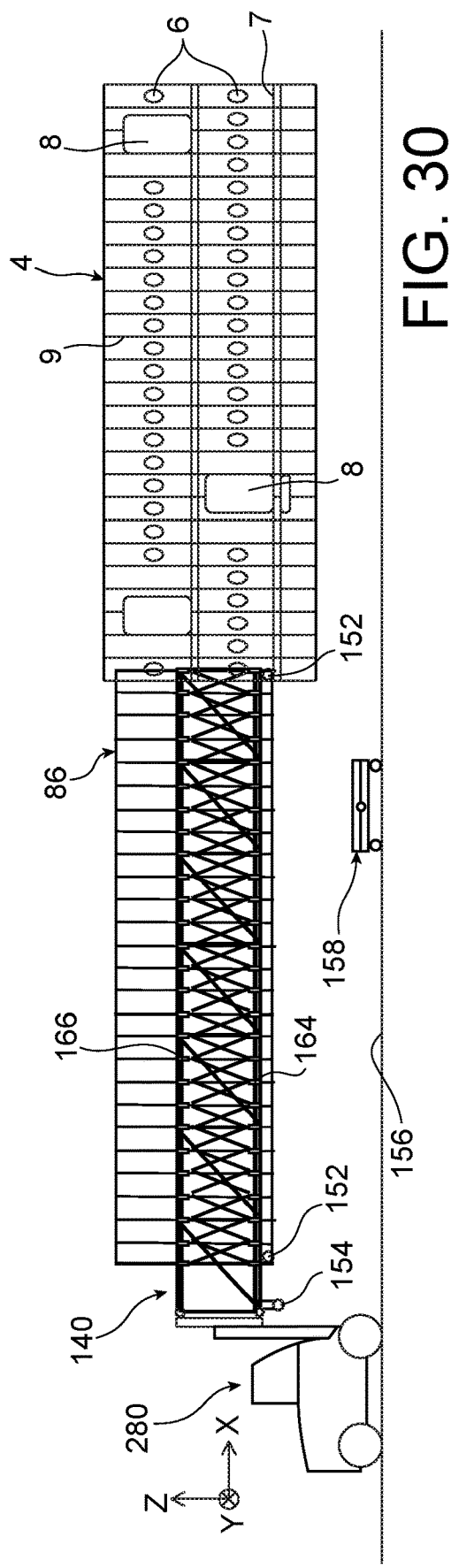

When the other longitudinal end of the support device 140 is in abutment on a floor of the aircraft section 4 (FIG. 29), in this case on the lower floor 7 thereof, the additional movable support 158 can be retracted in its lower configuration (FIG. 30).

The insertion of the support device 140 continues until the mattresses 50 are facing their installation position on the fuselage (FIG. 31), then the forklift truck 280 and the additional support 158 can be withdrawn.

Figure 31:
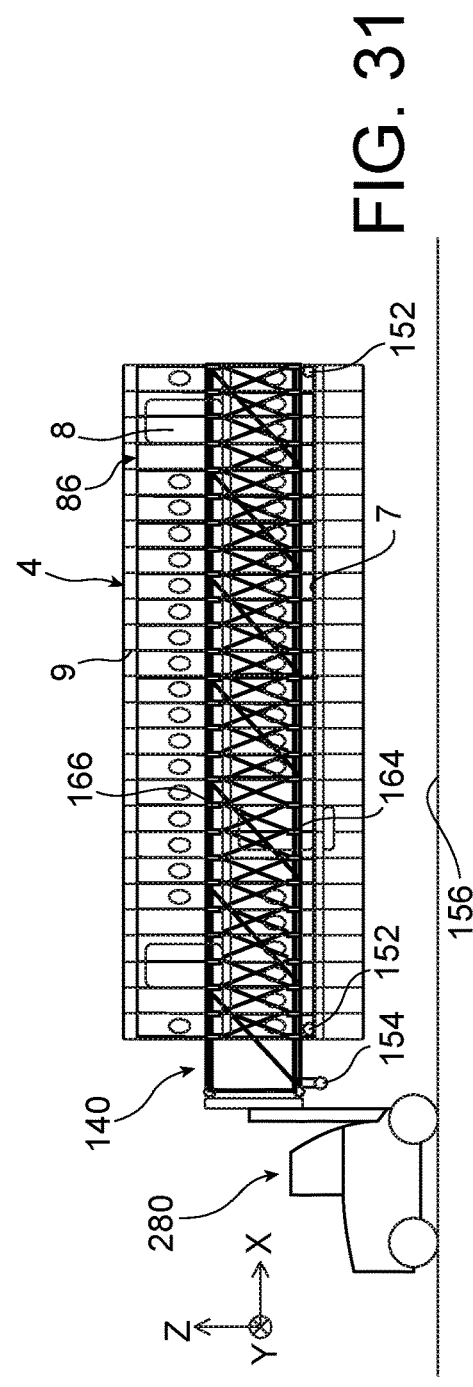

With reference to FIG. 31, it is to be noted that the additional castors 154 are arranged so as not to penetrate the space delimited by the aircraft structure and, more generally, so as not to interfere with the lower floor 7, so that the support device effectively rests on its main castors 152.

Figure 32:
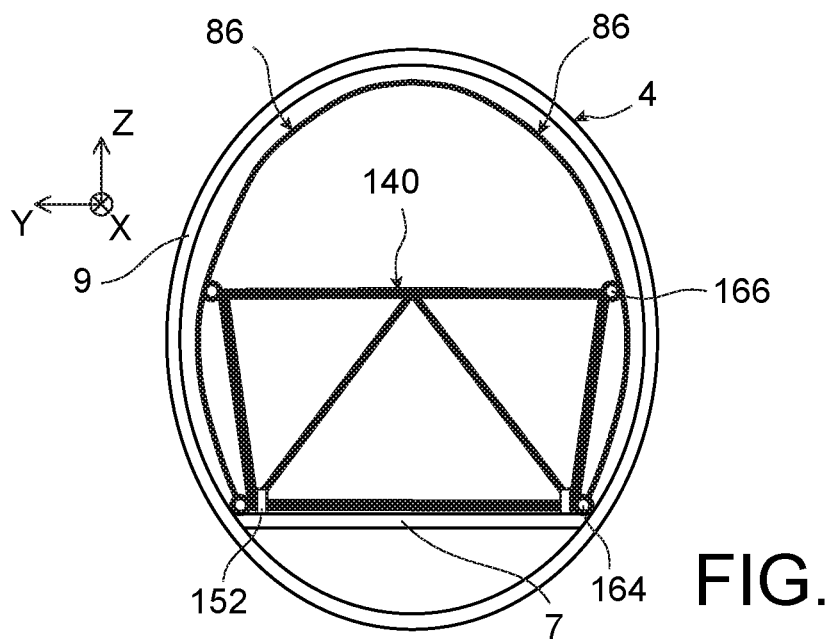
FIG. 32 is a schematic transverse section view of the aircraft structure and of the support device supporting the two mattresses in the state shown in FIG. 31.

FIG. 32 is a transverse section view of the fuselage section 4 and of the support device 140 supporting the two mattresses 50, in the state shown in FIG. 31.

Figure 33:
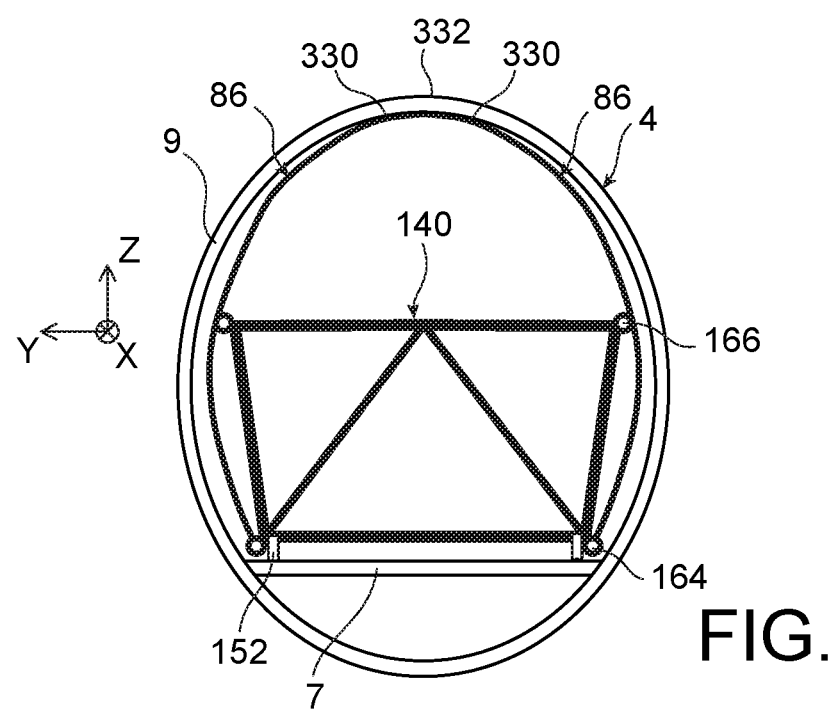
FIG. 33 is a view similar to that of FIG. 32 showing a step of elevating the support device.

The method subsequently comprises a step of elevating the support device 140 (FIG. 33), for example, by means of lifting jacks (not shown), by which the main castors 152 are connected to the lattice structure 142 of the support device, so as to bring together an upper part 330 of each of the mattresses 50 with an upper part 332 of the aircraft structure.

Subsequently, the method generally comprises a step of detaching each of the mattresses 50 from the support device 140 and a step of fixing each of the mattresses 50 to the aircraft support structure 4.

Figure 34:
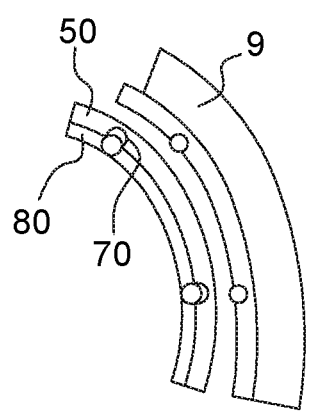
FIGS. 34 to 36 are larger scale partial transverse section schematic views of part of FIG. 33 showing a step of detaching a mattress from the support device and a step of fixing the mattress to the aircraft structure.
Figure 35:
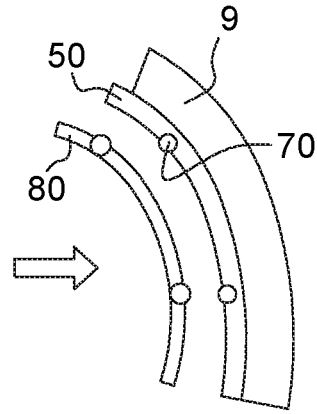

In the preferred embodiment of the invention, the detachment of each mattress, shown in FIG. 34, involves undoing the fixing provided by the reversible fixing devices 70. In this case, it involves separating the loop parts and the hook parts of the hook and loop devices.

Each mattress 50 is thus detached from the corresponding flexible structure 82.

Figure 36:
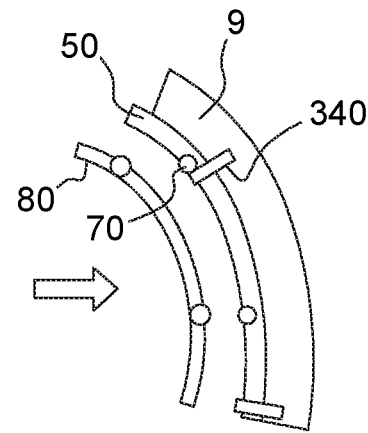

Each mattress 50 is subsequently applied to the aircraft structure 4, in this case on respective heels of the circumferential fuselage frames 9 (FIG. 33), then fixed to the aircraft structure 4, for example by means of resilient staples 340 (FIG. 36).

Figure 37:
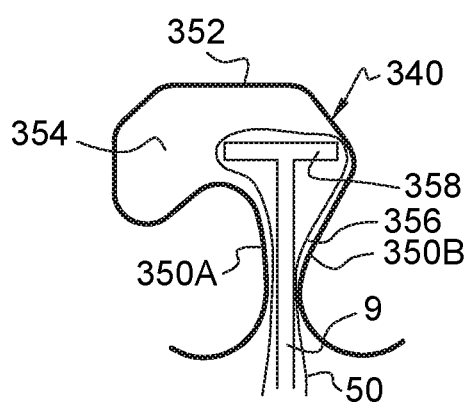
FIG. 37 is a schematic section view of a resilient staple for fixing the mattress to the aircraft structure.

FIG. 37 shows an example of such a resilient staple 340, comprising two feet 350A, 350B connected by a head 352 and defining an extended space 354 and a constriction 356. The installation of such a staple involves forcing the passage of the heel 358 of a circumferential frame 9 through the constriction 356, while benefiting from the resilient nature of the feet 350A, 350B, until the heel 358 enters the extended space 354 and is retained therein by the feet 350A, 350B.

Thus, the resilient staples 340 clamp each of the mattresses 50 together with a heel 358 of a corresponding circumferential frame 9.

The steps of detaching each mattress 50 from the support device 140 and of fixing the mattresses 50 to the aircraft structure 4 can be implemented successively or at the same time.

In the first case, the whole of a mattress 50 is detached from the support device 140, then the whole of the mattress 50 is fixed to the aircraft structure 4, whereas in the second case, some parts of a mattress 50 are fixed to the aircraft structure 4 while other parts of this mattress are still attached to the support device 140.

The method subsequently comprises a step of removing the support device 140 outside the aforementioned aircraft section, in this case outside the space delimited by the fuselage section 4. This removal is implemented, for example, by means of the forklift truck 280 and the additional movable support 158 (FIGS. 38 and 39).

In the preferred embodiment of the invention, the support device 140 still supports the two flexible structures 82, which therefore are also removed outside the aircraft section.

Each flexible structure 82 can then be retracted in order to be stored with a view to being reused for the installation of another mattress in another aircraft section, according to a similar method.

Of course, in the variations where each flexible structure 82 is fixed to the mattress in a non-detachable manner, the flexible structure 82 remains an integral part of the aircraft, in which case the step of removing the support device outside the aircraft section does not involve the removal of the flexible structures outside this aircraft section.

Figure 40:
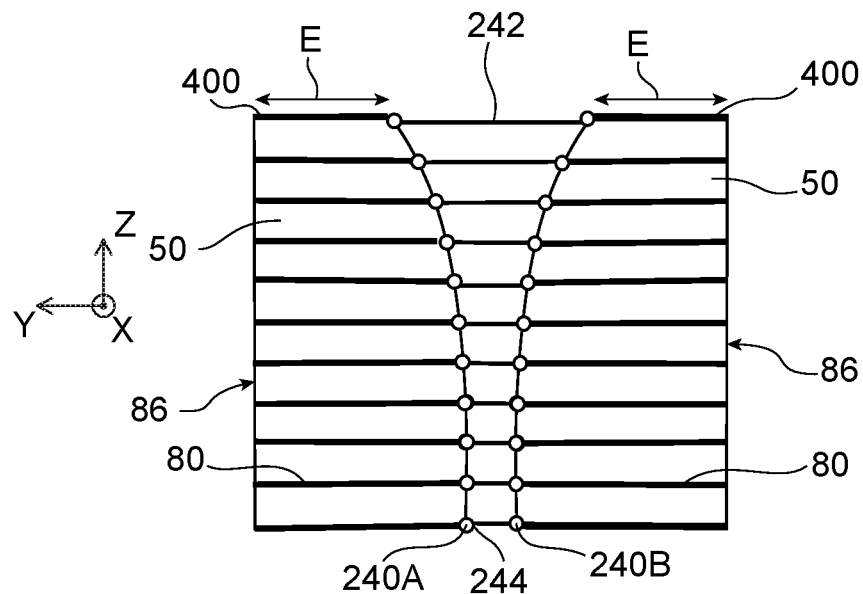
FIG. 40 is a view similar to that of FIG. 24 showing a variation of the method, in which the method is applied to the thermophonic insulation of an aircraft tail cone.

FIG. 40 is a similar view to that of FIG. 24, which shows a variation, in which the mattresses 50 each have a transverse span E that extends from a longitudinal end 400 of the mattress 50.

In the example shown, beyond a certain distance measured from its longitudinal end 400, each mattress 50 has a constant transverse span.

The mattress 50 that is shaped in this manner allows aircraft sections to be insulated that are delimited by structures having a dual curvature, such as the nose cone 3 and the tail cone 5.

Support devices 140A and 140B adapted to the respective conformations of such mattresses 50, particularly to the length thereof, are provided to this end.

Figure 41:
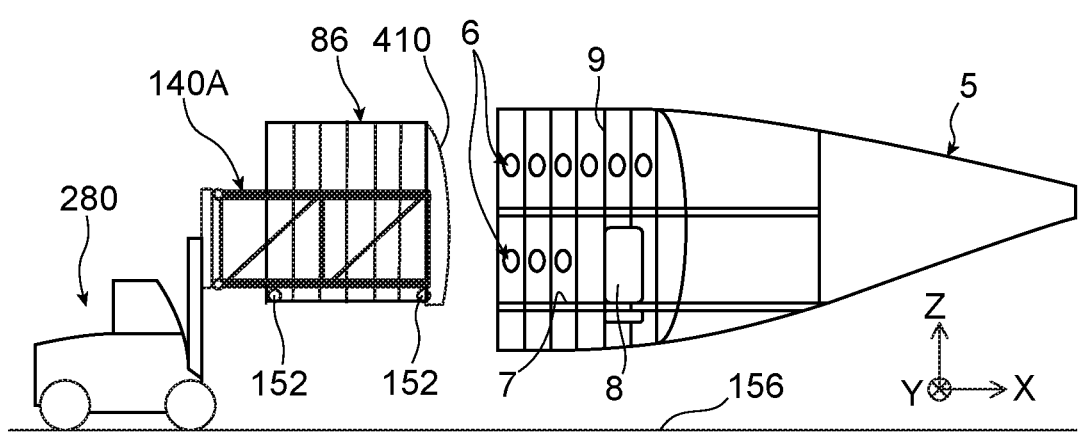
FIG. 41 is a view similar to that of FIG. 28 showing the variation of the method, in which the method is applied to the thermophonic insulation of the aircraft tail cone.
Figure 42:
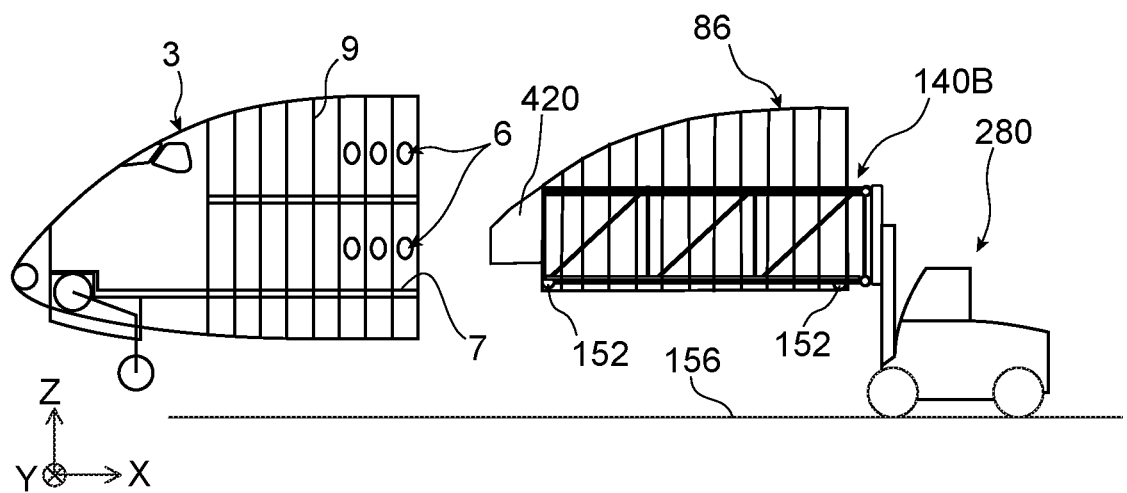
FIG. 42 is a view similar to that of FIG. 41 showing another variation of the method, in which the method is applied to the thermophonic insulation of an aircraft nose cone.

FIG. 41 thus shows the application of the method according to the invention to the insulation of the tail cone 5, by means of the mattresses 50 shown in FIG. 40, whereas FIG. 42 shows the application of the method according to the invention to the insulation of the nose cone 3, by means of the mattress exhibiting a conformation that is adapted to this end, in a similar manner In both cases, a closure mattress 410, 420, respectively, is fixed, before the corresponding support device is inserted into the aircraft section to be insulated, on a longitudinal end of each of the corresponding thermophonic insulation modules 86 or on a longitudinal end of the corresponding support device, with a view to forming the thermophonic insulation of a rear and front base, respectively, of the fuselage 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for thermophonically insulating an aircraft section, comprising:
   providing two mattresses;
   fixing a separate respective flexible structure onto each of the mattresses;
   engaging first respective parts of the flexible structures with a support device, by leaving free respective second parts of the flexible structures arranged at a distance from the first parts;
   mutually bringing together the respective second parts of the flexible structures resulting in bending of the flexible structures and curvature of the mattresses in respective directions orthogonal to a longitudinal direction of each of the mattresses, while the support device retains the first respective parts of the flexible structures one relative to the other in a direction orthogonal to the longitudinal direction;
   locking a resulting position of the second parts so as to maintain the flexible structures in a bent conformation and the mattresses in a curved conformation;
   inserting the support device supporting the flexible structures that are respectively secured to the mattresses into the aircraft section;
   detaching each of the mattresses from the support device and fixing each of the mattresses to an aircraft structure delimiting the aircraft section;
   removing the support device outside the aircraft section.

2. The method according to claim 1, further comprising, between the step of inserting the support device into the aircraft section and the step of detaching each of the mattresses from the support device, a step of elevating the support device so as to bring together an upper part of each of the mattresses with an upper part of the aircraft structure delimiting the aircraft section.

3. The method according to claim 1, wherein the step of fixing the flexible structures respectively on the mattress comprises detachably fixing each of the flexible structures on the corresponding mattress, the step of detaching each of the mattresses from the support device comprises detaching each of the mattresses from the corresponding flexible structure, and the step of removing the support device outside the aircraft section comprises removing the flexible structures supported by the support device outside the aircraft section.

4. The method according to claim 1, wherein the aircraft section is an intermediate fuselage section.

5. The method according to claim 1, wherein the support device comprises a lower floor and an upper floor arranged above and at a distance from the lower floor, and wherein the steps respectively involving mutually bringing together the respective second parts of the flexible structures and of locking the position of the second parts are implemented by at least one operator standing on the upper floor.

6. The method according to claim 1, wherein the step of mutually bringing together the second respective parts of the flexible structures is implemented by pulling on at least one cable cooperating with the second parts.

7. The method according to claim 6, wherein the step of locking the position of the second parts is implemented by locking the cable relative to one of the flexible structures or by fixing part of the cable to the support device.

8. The method according to claim 1, wherein the step of fixing each of the mattresses to the aircraft structure delimiting the aircraft section comprises fixing each of the mattresses to circumferential fuselage frames belonging to the aircraft structure.

9. The method according to claim 8, wherein the fixing of each of the mattresses to the circumferential fuselage frames is carried out by means of resilient staples, each clamping the corresponding mattress together with a heel of the corresponding circumferential fuselage frame.

10. The method according to claim 1, wherein the aircraft section is a fuselage nose cone or a fuselage tail cone.

11. The method according to claim 10, wherein each of the mattresses has a transverse span that extends from a longitudinal end of the mattress.

12. The method according to claim 1, wherein each flexible structure comprises battens extending orthogonally to the longitudinal direction of the corresponding mattress and being spaced apart from each other in the longitudinal direction of the corresponding mattress.

13. The method according to claim 12, further comprising, between the step of inserting the support device into the aircraft section and the step of detaching each of the mattresses from the support device, a step of deploying each flexible structure resulting in mutual separation of the corresponding battens in the longitudinal direction of the corresponding mattress, so as to transition each of the mattresses from a compacted configuration to an installation configuration.

14. The method according to claim 12, wherein the step of engaging the first respective parts of the flexible structures with the support device involves respectively engaging first respective end parts of the battens in retention devices movably mounted on the support device.

15. The method according to claim 12, wherein the mutual separation between the battens in the longitudinal direction of the corresponding mattress inside each of the flexible structures is constrained by at least one synchronization device formed by deformable parallelograms articulated in series one relative to the other and respectively connected to the battens.

* * * * *